(12) United States Patent
Frick

(10) Patent No.: US 8,226,335 B2
(45) Date of Patent: Jul. 24, 2012

(54) DEVICE AND APPARATUS COMPRISING SAID DEVICE FOR WORKING THE END OF A TUBE

(75) Inventor: Ulrich Frick, Singen-Beuren (DE)

(73) Assignee: Illinois Tool Works Inc., Glenview, IL (US)

( * ) Notice: Subject to any disclaimer, the term of this patent is extended or adjusted under 35 U.S.C. 154(b) by 341 days.

(21) Appl. No.: 12/679,081

(22) PCT Filed: Sep. 19, 2008

(86) PCT No.: PCT/US2008/076930
§ 371 (c)(1),
(2), (4) Date: Mar. 19, 2010

(87) PCT Pub. No.: WO2009/039329
PCT Pub. Date: Mar. 26, 2009

(65) Prior Publication Data
US 2010/0257981 A1    Oct. 14, 2010

(30) Foreign Application Priority Data
Sep. 22, 2007 (DE) .......................... 10 2007 045 331

(51) Int. Cl.
*B23B 5/16* (2006.01)
*B23B 5/00* (2006.01)
(52) U.S. Cl. ........................................ 407/113; 407/128
(58) Field of Classification Search ................ 407/113, 407/128, 142, 158, 46, 70.1, 70.2, 84, 92; 409/138, 140
See application file for complete search history.

(56) References Cited

U.S. PATENT DOCUMENTS

| | | | |
|---|---|---|---|
| 3,501,872 A | | 3/1970 | Mighton |
| 3,608,406 A | | 9/1971 | Paysinger et al. |
| 3,744,356 A | | 7/1973 | Slator et al. |
| 3,893,263 A | * | 7/1975 | Jackman et al. ............. 451/246 |
| 3,987,523 A | * | 10/1976 | Nelson et al. ................. 29/33 T |
| 4,437,366 A | * | 3/1984 | Astle .............................. 82/113 |
| 6,082,235 A | | 7/2000 | Kramer |
| 6,109,151 A | * | 8/2000 | Braun et al. ..................... 82/48 |
| 6,176,163 B1 | | 1/2001 | Kramer |
| 6,220,130 B1 | * | 4/2001 | Beakley .......................... 82/113 |
| 2002/0053267 A1 | | 5/2002 | Zanin |

FOREIGN PATENT DOCUMENTS

| | | |
|---|---|---|
| DE | 9006792 U | 9/1990 |
| DE | 4019340 A | 12/1991 |
| DE | 19510881 A1 | 10/1995 |
| DE | 19816179 C1 | 11/1999 |
| EP | 0855944 A1 | 8/1998 |

OTHER PUBLICATIONS

ISR for PCT/2008/076930 dated Jan. 14, 2009.
German Search Report for Application No. 10 2007 045 331.2 dated Mar. 3, 2010.

* cited by examiner

*Primary Examiner* — Will Fridie, Jr.
(74) *Attorney, Agent, or Firm* — Lowe Hauptman Ham & Berner LLP

(57) ABSTRACT

A pipe-end processing tool and a pipe-end processing system for it. A guide roller is used which runs along the inside peripheral surface of a pipe to be processed and as a result keeps an implement designed to machine an outer edge bezel of said pipe at a constant radial distance from the inside peripheral surface. As a result residual wall thicknesses constant over the full pipe periphery are generated even when the pipe is not rigorously circular, for instance illustratively oval.

14 Claims, 4 Drawing Sheets

DEVICE AND APPARATUS COMPRISING SAID DEVICE FOR WORKING THE END OF A TUBE

RELATED APPLICATIONS

Figure 1:
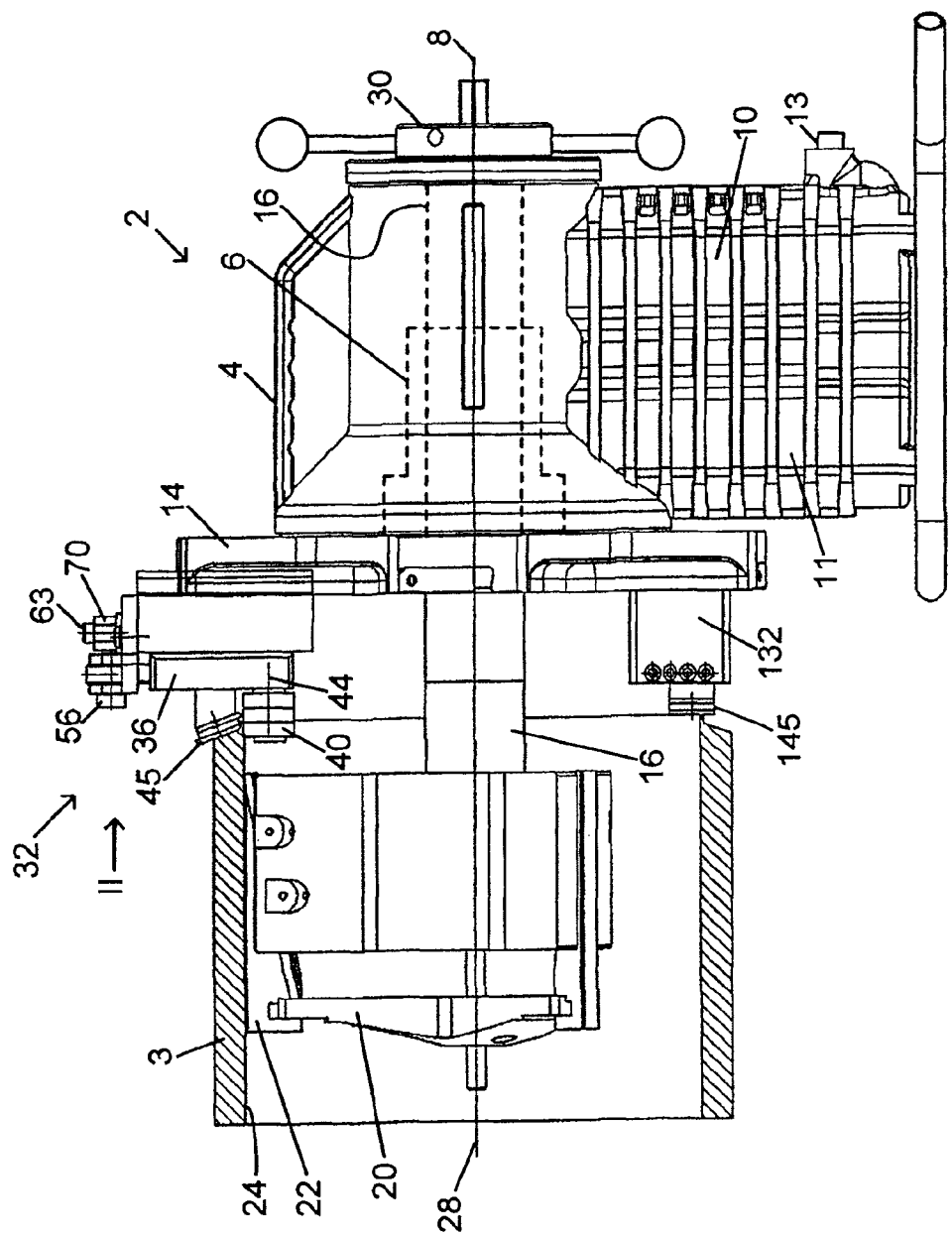

The present application is national phase of International Application Number PCT/US2008/076930, filed Sep. 19, 2008, and claims priority from German Application Number 10 2007 045 331.2, filed Sep. 22, 2007, the disclosures of which are hereby incorporated by reference herein in their entirety.

The present invention relates to a pipe-end processing device—hereafter system—as defined in the preamble of claim 1.

Moreover the present invention relates to a pipe-end processing tool containing such a pipe-end processing system.

A pipe-end processing tool and a pipe-end processing system designed for it are known from U.S. Pat. No. 6,082,235 (=EP 0855 944 B1) and U.S. Pat. No. 6,176,163 (=DE 198 16 179 C1).

When a pipe end is non-circular, being ovate for instance, then more of the pipe's material is removed in the state of the art from the larger outside pipe diameter than from the smaller pipe diameter at the sites where chamfered or externally offset pipe end faces are constituted because the chipping implement rotates circularly at constant radius. As a result different, residual wall thicknesses are formed at the pipe end circumferentially about the said pipe. When such a pipe end is welded to that of another circular or non-circular pipe, there is danger that in the course of welding one of the pipes shall burn through in an area of lesser residual wall thickness and/or that welding-electrode material shall pass through such a burn hole into the pipe inside. Moreover there is danger that the inside surfaces of the pipes no longer are flush, instead subtending an offset disadvantageously affecting the subsequent flow of fluid through the pipes. To avert such drawbacks, it has already been suggested shaping the pipe ends not only at their outer periphery but also circularly at their inner periphery relative to the pipe center using a cutting implement. Such a step however entails another danger, namely that the pipe ends have been made too thin thereby for welding or that they shall not be mechanically strong enough to withstand mechanically the pressure of the medium (liquid, gas, steam) passing through them. Attempting to circumvent the last cited drawback, frequently the pipes used must be of a wall thickness larger than would be required if all pipes were precisely circular and of a constant radius everywhere: this is not the case in practice.

The objective of the present invention is to create a relevant pipe-end processing tool and a pipe-end processing system allowing externally chamfering both circular and non-circular pipes at the external pipe end or offsetting latter in a manner that the pipe-end's residual wall thickness shall be constant over the entire pipe periphery.

Another objective of the present invention is to design the pipe-end processing tool and the pipe-end processing system in a manner that they can be manufactured compactly and be lightweight.

Still another objective of the present invention is to design the pipe-end processing tool and the pipe-end processing system in a manner allowing easy operation.

The objective of the present invention is attained by a pipe-end processing system defined in claim 1.

Further features of the present invention are defined in the dependent claims.

Moreover the above objective of the invention shall be attained by means of a pipe-end processing tool fitted with such a pipe-end processing system.

The pipe-end processing tool may comprise a motor driving the pipe-end-processing system into rotation or a rotatably supported drive actuated by a motor.

The said motor may be electrical, pneumatic or hydraulic.

The invention is elucidated below by means of an illustrative, preferred embodiment mode and in relation to the appended drawings.

Figure 5:
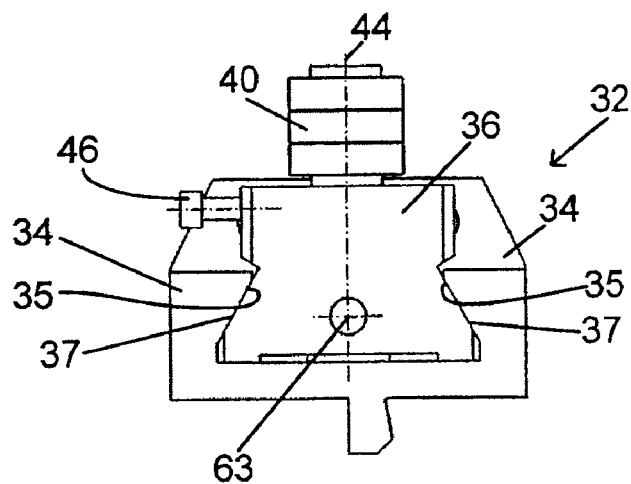
Figure 2:
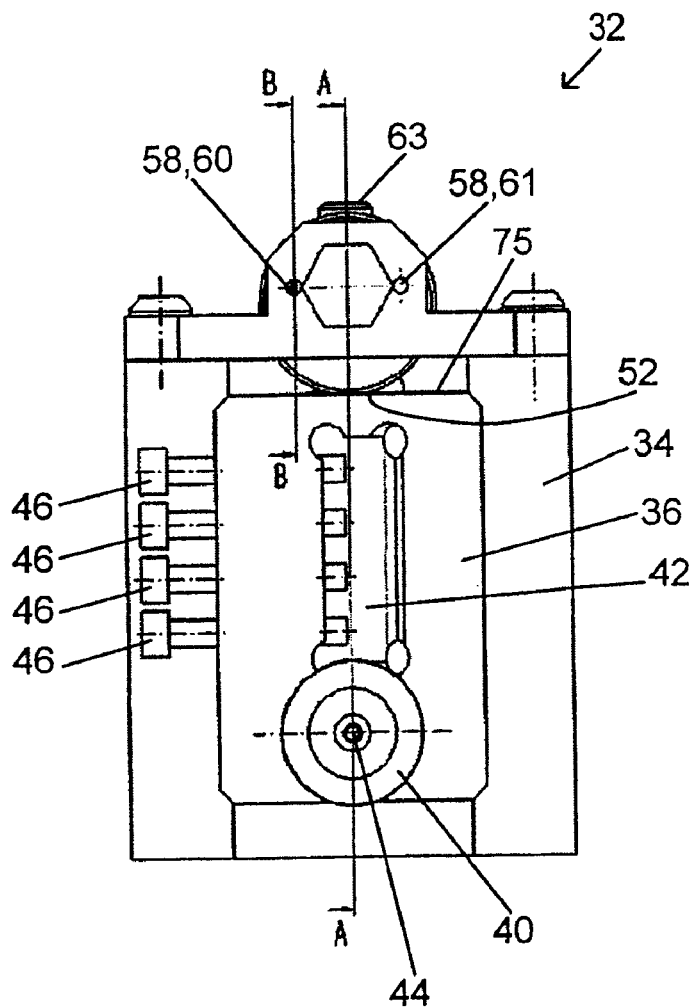
Figure 3:
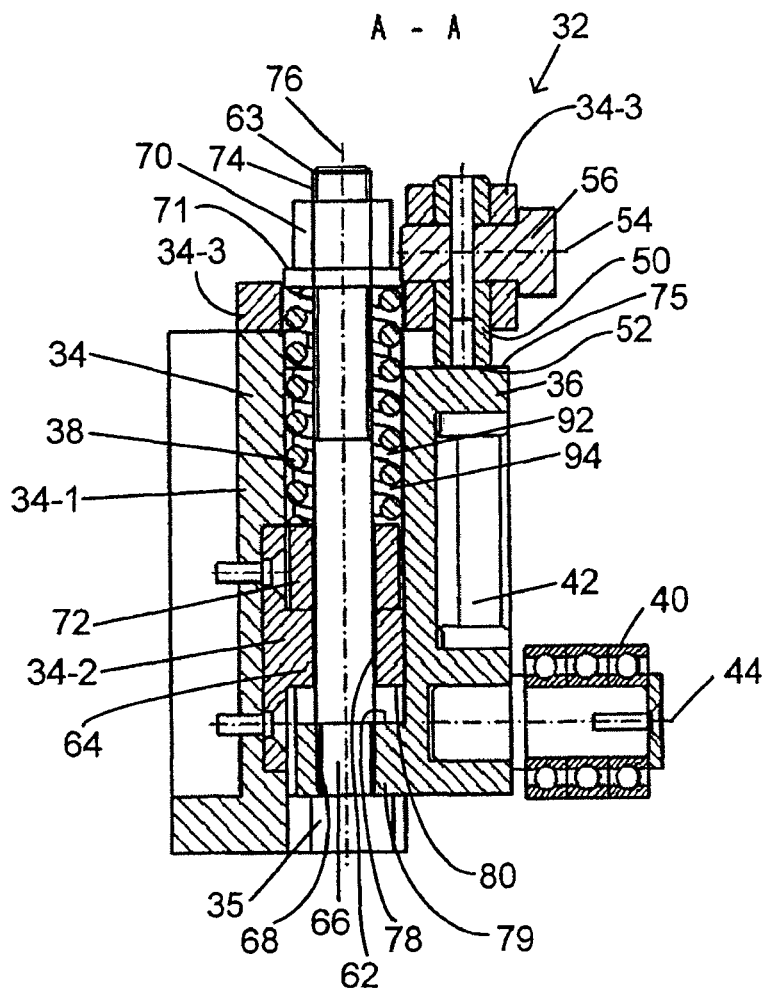
Figure 4:
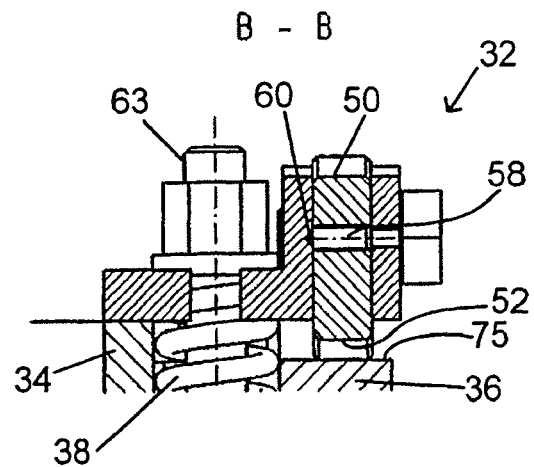
Figure 6:
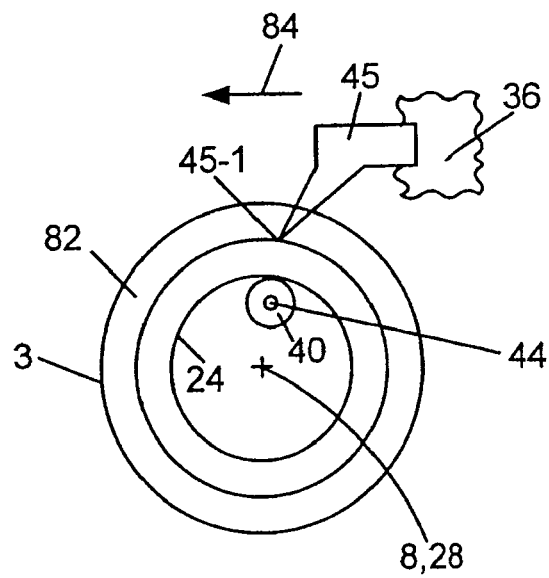
Figure 7:
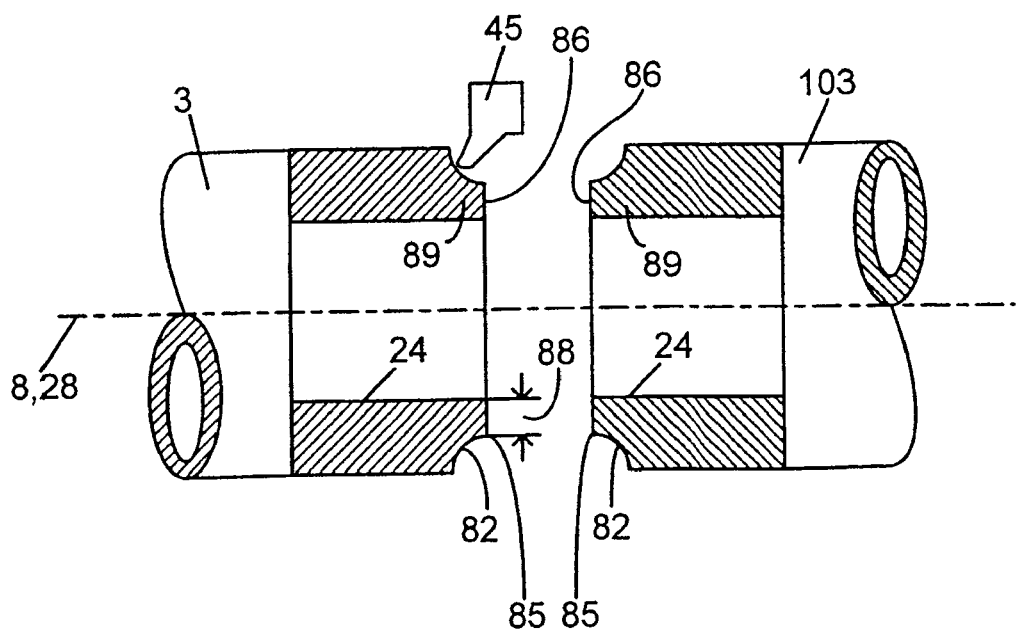

FIG. 1 shows a pipe-end processing tool of the invention with a pipe-end processing system of the invention shown in sideview, FIG. 2 is a front elevation of the pipe-end processing system of the present invention seen in the axial direction II of FIG. 1, FIG. 3 is an axial section of the pipe-end processing system seen in the plane A-A of FIG. 2, said plane E-E running longitudinally and radially relative to the system's axis of rotation, FIG. 4 is a longitudinal section in the plane B-B of FIG. 2 of a detail of the pipe-end processing system, said plane B-B running parallel to the plane A-A, FIG. 5 is a bottom view of the pipe-end processing system of FIG. 3 seen radially outward from a system axis of rotation, FIG. 6 is a schematic end view of a pipe to be processed in combination with a cutting implement and a guide roller which runs on the inside periphery of the pipe and guides the cutting element, and FIG. 7 is a sideview both of the pipe of FIG. 6 and of a second pipe to be welded to the first.

The pipe-end processing tool 2 shown in FIG. 1 is portable and may be affixed in a pipe 3 to be processed which then shall support/brace it. In another embodiment mode of the present invention, the pipe-end processing tool also may be designed to be fixed in location for instance on a suitable support.

Such a support may be a flange or a wheel or a shaft 6 and is rotatably configured in a housing 4 of the pipe-end processing tool 2 of FIG. 1 so as to be rotatable about a system axis of rotation 8 and being driven by means of a motor 10 and a drive transmission element 11 such as a belt, chain or gear unit. In another (omitted) embodiment mode, the motor 10 and also the drive transmission 11 may be mounted outside the housing 4 or be a separate unit that may be connected to a drive element 13 which is rotatably supported in the housing 4, said drive element being connectable to or connected to the said shaft 6. The motor may be electrical, pneumatic or hydraulic.

An implement support 14 is affixed to the front end of the shaft 6 near the front end of the housing 4 to allow said implement holder to rotate jointly with said shaft 6 about the system's axis of rotation 8.

A hollow affixation tube 16 irrotationally affixed in the housing 4 runs axially relative to the system's axis of rotation 8 through the hollow shaft 6.

The affixation tube 16 extends from the front end of the housing 4 and also projects from an omitted central aperture of the implement support 14. The affixation tube 16 bears a chuck 20 at its projecting front pipe-end segment. The chuck 20 is fitted with at least three clamping jaws 22 configured equidistantly at 120° between each other around the system's axis of rotation 8 and allowing clamping the pipe-end processing tool 2 to the inside peripheral surface 24 of the pipe 3 to be processed. The system axis of rotation 8 is situated at the radial center of the pipe 3 and hence is aligned in the central longitudinal pipe axis 28. A manually actuated wheel 30 is configured outside the rear end of the housing 4 centrally with the system axis of rotation 8 by means of which an omitted mechanical transmission such as a threaded rod or an axially displaceable linkage may drive the chuck 20 into clamping or disengaging the clamping jaws 22 radially against the pipe or disengage them from it. The displacement transmission of the manual wheel 30 runs through the affixation tube 16.

The pipe-end processing tool 2 contains a pipe-end processing system 32 of which the details are shown in FIGS. 2, 3, 4 and 5.

The pipe-end processing system 32 contains a body 34 and an implement holder 36. The body 34 is configured radially away from the system axis of rotation 8 and is affixed/affixable at the radially outer terminal zone of the implement support 14 and as a result is rotatable by means of the implement support 14 about the system axis of rotation 8. Preferably the body 34 can be positioned at different distances from the system axis of rotation 8.

The implement holder 36 is mounted radially displaceably relative to the system axis of rotation 8 on the body 34. The implement holder 36 is fitted with guide faces 37 which make contact with guide faces 35 at the body 34, as a result of which the implement holder 36 is radially displaceable and preferably also may be affixed longitudinally (regarding the system axis of rotation 8 to the body 34. Jointly the guide surfaces 35 and 37 shall preferably constitute a dovetail guide or a T-guide. A spring 38 radially biasing the implement holder 36 radially outward is configured between the said implement holder and the body 34. Preferably the spring 38 is a helical compression spring configured radially to the system axis of rotation 8. While this particular design is advantageous, other springs are not excluded.

At least one guide roller 40 is configured at the implement holder 36 being radially nearer to the system axis of rotation 8 than is an implement seat 42 of the implement holder 36. The minimum of one guide roller 40 is supported in freely rotating manner and its guide roller axis of rotation 44 runs parallel to the system axis of rotation 8, as a result of which the guide roller 40 is able to run against the inside surface 24 of the pipe 3 to be processed while keeping the implement holder 36 against the spring force from the spring 38 and can keep the said holder at the same radial position to the inner surface 24 of the pipe 3 over the full inside peripheral surface 24 of the pipe 3 even when the pipe radius various along its periphery.

The implement seat 42 of the implement holder 36 is designed to hold an implement 45 and for that purpose is fitted for instance with screws to clamp the implement 45 into said seat 42. Preferably the implement seat 42 is a clearance or recess in the said holder. The implement 45 is a cutting/chipping implement, illustratively like the lathe chisels, bits. In another embodiment mode, the implement may be a grinder element.

The guide roller 40 illustratively may be in the form of one, two, three or more axially adjoining rollers or bearings, for instance three roller bearings, as schematically indicated in FIGS. 3 and 5.

The body 34 may be integral or in several parts. Illustratively the body 34 may be a base plate 34-1, an intermediate element 34-2 and a cover plate 34-3.

A wedge 50 is configured adjustably between the implement holder 36 and the body 34 and is fitted with a wedging face 52 acting radially to the system axis of rotation 8 on the implement holder 36 by means of which said holder is adjustable, relative to the body 34 against the opposing force from the spring 38, alternatively to the minimum distance from system axis of rotation 8 or being released to be displaced toward a larger radial distance from the system axial of rotation 8. When the wedge 50 in this manner releases the implement holder 36, the implement holder may be adjusted by the spring to assume a larger distance from the said axis of rotation 8.

Preferably the wedge 50 is displaceably affixed to the body 34 for instance at its cover plate 34-3 and acts by its wedging face 52 on the implement holder 36.

In the preferred embodiment mode of the present invention, the wedging face 50 is an excentric cam 50 configured rotatably about a cam axis of rotation 54 at the body 34, for instance at its cover plate 34-3, said wedging face 52 being constituted at said cam's outer periphery. The cam 50 may be rotated manually, for instance using a manual wheel or a wrench, about the cam axis of rotation 54. For that purpose the cam 50 may be fitted with a wrench head 56 fitted with an inner polygonal recess or an outer polygon to which a wrench shall be applied. The cam 50 appropriately shall be operable when its axis of rotation 54 runs parallel to the system axis of rotation 8.

As shown by the FIGS. 2 and 4, the cam 50 may be fitted with a spring-loaded pin 58 which shall be stopped when in a recess 60 of the body 34 where its highest wedging face points to the implement holder 36 shown in FIGS. 2, 3 and 4, whereas said pin shall be stopped, in a second recess 61 of the body 34, offset by 180°, when the cam 50 has been rotated by 180° about the cam axis of rotation 54 and then its lowest wedging face points toward the implement holder 36. The highest and lowest wedging face positions at the cam 50 also may be offset from each other by more or less than 180°. In the latter case, the recesses 60 and 61 must be commensurately position.

In another omitted embodiment mode of the present invention, the wedge 50 instead of being in the form of a cam 50 also may be in that of a cuneiform slider configured between two mutually radially opposite faces of the implement holder 36 and of the body 34 and displaceable tangentially to the system axis of rotation 8.

In a preferred embodiment mode of the present invention shown in the drawings, a rod 63 is used which is configured radially relative to the system axis of rotation 8 and runs through a feedthrough aperture 62 in a wall 64 of the body 34 (spacer 34-2). The rod 63 is affixed on the radially inner side, relative to the system axis of rotation 8, of the wall 64, to the implement holder 36, for instance a threaded segment 66 at the lower rod portion, into a threaded borehole 68 of the implement holder 36. On the radially outer side, as seen in the direction of the system axis of rotation 8, of the wall 64 of the body 34, the rod 63 runs in the spring's longitudinal direction through the spring 38 and is fitted at its radially outer end with a head 70 supporting directly or indirectly the radially outer end of said spring 38 or a spacer layer 71. The radially inner end of the spring 38 rests directly or by means of a washer 72 or the like on the radially outwardly pointing face of the wall 64 of the body 34. In this manner the spring 38 is clamped between the body 34 and the implement holder 36, whereby it exerts a pressure applied radially away from the system axis of rotation 8 outwardly against the cam 50. The head 70 may be an integral element (for instance a screw head) of the rod 63 (for instance a bolt/screw). In the shown embodiment mode, the head element 70 is a threaded nut screwed onto an upper threaded segment 74 of the rod 63. In this manner the spring bias of the spring 38 may be adjusted in simple manner. However the spring bias also might be adjusted by rotating the inner threaded segment 66 of the rod 63 within the threaded borehole 68 provided portion of the rod 63 near the threaded segment 66 shall not rest against the edge of the threaded borehole.

The longitudinal rod axis 76 of the rod 63 runs radially to the system axis of rotation 8.

The implement holder 36 assumes its radially innermost position when the radially highest wedging face position of the cam 50 is situated radially opposite a radially outwardly pointing first stop face 75 of said holder and makes contact with said stop face 75. If the cam 50 is rotated in a manner that its wedging face 52 is displaced relative to the first stop face 75 from the highest to the lowest wedging face position, the spring 38 shall radially outwardly displace the implement holder 36 relative to the body 34 toward the system axis of rotation 8 until a second stop face 78 of the implement holder 36 makes contact with a mutually radially opposite stop face 80 of the body 34. The stop face 78 illustratively may be constituted by an axially parallel protrusion 79 of the implement holder 36 containing the thread 68. The stop face 80 may be constituted by the radially inwardly pointing face of the wall 64 of the body 34. In that case the implement holder 36 assumes its radially outermost position when the two stop faces 78 and 80 make contact with each other.

In another embodiment mode of the present invention, the radially outermost position of the implement holder 36 may be implemented by the wedging face position of the cam 50 at the first stop face 75 instead of the stop faces 78 and 80.

Pipes should be preferably uniformly circular. Regrettably this is not always the case. FIG. 6 schematically shows a front view of a somewhat non-circular pipe, a guide roller 40 of the present invention at the pipe inside periphery 24 and an implement 45, guided by the guide roller 40, to form an outer edge bezel 82 at the front end of the pipe 3. The implement 45 being guided by the guide roller 40, both are affixed to the implement holder 36. Because the implement 45 is guided by the guide roller 40 rolling in the peripheral direction on the inside peripheral surface 24 of the pipe 3, the implement tip 45-1 always is at the same distance from the inner pipe periphery 24 regardless of the changing distance between the pipe wall and the pipe center axis 28 which simultaneously is also the system axis of rotation 8. The direction of rotation of the implement 45 about the pipe 3 is indicated in FIG. 6 by an arrow 84.

The external edge bezel 82 of the pipe 3 may be a flat, convex or concave chamfer or the form of a terminal pipe offset such as illustratively shown by FIG. 7 of the side view of the pipe 3. FIG. 7 shows a second pipe 103 of which the front end is fitted in the same way with an external edge bezel 82 as the aforementioned pipe 3. In this manner the two pipes 3 and 103 may butt against each other and be rotated relative to each other about the pipe center axis 28 respectively the system axis of rotation 8 in a manner that the inner peripheral surfaces 24 of the two pipes 3 and 103 are axially flush with each other at all peripheral positions and the radially inward edges 85 of the external edge bezels 82 also are mutually aligned at all peripheral positions. In order to weld together the two pipes 3 and 103, their residual, radially inward faces 86 situated radially within the outer edge bezel 82 are made to abut and thereby make contact with one another, whereby the two axially opposite outer edge bezels 82 jointly subtend a peripheral groove wherein a welded seam may be formed. Because the residual wall thickness 88 of the axial pipe protrusions 89 radially remaining within the outer edge bezel can be accurately defined by the pipe-end processing system of the present invention, there is no danger that said thickness might be larger in some peripheral places and lesser or even discontinuous in others.

In an especially advantageous embodiment mode of the present invention, the spring 38 is integrated completely or at least along 90% of its length into the sub-assembly of body 34 and implement holder 36, either into the body or into the holder or into both. According to the preferred embodiment mode, the spring 38 is housed completely in a recess 92 of the body 34. The recess 92 is fitted with a recess cover 94 facing the implement holder 36 and is at least partly covered by it, said recess being situated at a longitudinal side of the spring 38.

In a further but omitted embodiment mode of the present invention, the body 34, at a minimum its base plate 34-1, is not a separate part but instead consists of a portion of the implement support 14.

As a result, the present invention also allows using very thin pipes when being welded to each other to pass highly pressurized fluids; such fluids may be liquid, gaseous or steam/vapors.

As shown in FIG. 1, the implement support 14 may bear one or more pipe-end processing systems, for instance the above described pipe-end processing system 32 and a pipe-end processing system 132 fitted with a metal cutting implement 145 to process the pipe end, for instance the radially inward residual terminal face 86 of the pipe 3, in order to make them precisely orthogonal to the central longitudinal pipe axis 28.

Operation

First the cam 50 is rotated into that position shown in the Figures at which the highest wedging face site of the wedging face 52 presses against the stop face 75 of the implement holder 36 and keeps it in its radially innermost position. At this stage the second stop face 78 of the implement holder 36 subtends its largest distance from the stop face 80 of the body 34. In this state, the pipe-end processing tool 2 can be axially inserted jointly with its guide roller(s) 40 into a pipe 3 to be processed.

Within the radial gap between the stop surfaces 78 and 80, the pipes 3 to be processed may be of different inside diameters or be non-circular. As a result it is feasible to process pipes of different sizes. Preferably the body 34 is radially adjustable at the implement support 14 and can be affixed at different radial positions to process pipes of small and very large inside diameters.

Following the axial insertion of the pipe-end processing tool 2 together with its guide roller(s) 40 into the pipe 3 to be processed, the cam 50 shall be rotated in a manner that a lower or the lowermost wedging face site shall be opposite the first stop surface. As a result the cam 50 releases the implement holder 36 to allow the spring 38 to move it radially outward until the guide roller 40 makes contact with the inside peripheral surface of the pipe 3. Then the implement holder 36 can be rotated by means of the rotation of the implement support 14 around the pipe 3 and in the process it may be kept by the guide roller 40 at a constant radial spacing from the pipe inner periphery surface 24.

Preferably the radial dimensions of the above components are selected in a manner that the two stop faces 78 and 80 are able to make contact with each other when the lowermost wedging face site of the cam 50 is positioned opposite the first stop surface 75 and is radially close to it.

The invention claimed is:

1. A pipe-end processing system containing a body which can be positioned or is positioned rotatably about a system axis of rotation; an implement holder borne by the body; characterized in that the implement holder is configured at the body while being radially displaceable relative to the system axis of rotation; that at least one spring is configured between the implement holder and the body and forces the implement holder in the radial direction from the system axis of rotation outward against the body; that at least one guide roller is configured at the implement holder nearer the system axis or rotation than is an implement seat of the implement holder, where the guide roller(s) axis of rotation is configured parallel to the system axis of rotation whereby the guide roller(s) run(s) at the inner peripheral surface of a pipe to be processed and thereby are/is able to keep the implement holder against the spring force of the spring at the same radial position relative to the inside peripheral surface of the pipe at the full pipe surface; that a wedge is configured in adjustable manner between the implement holder and the body and comprises a wedging face which acts radially relative to the system axis of rotation and by means of which the implement holder is alternatively adjustable to a minimum distance from the system axis of rotation against the spring force of the spring or can be released for displacement toward a larger radial distance from the system axis of rotation, where, in the latter case, the implement holder is adjustable by means of the spring to a larger distance from the system axis of rotation.

2. Pipe-end processing system as claimed in claim 1, characterized in that the wedge is displaceable affixed to the body and acts by its wedging face on the implement holder.

3. Pipe-end processing system as claimed in claim 1, characterized in that the wedge is a rotatable cam fitted with the wedging face at its outer periphery.

4. Pipe-end processing system as claimed in claim 3, characterized in that the cam axis of rotation runs parallel to the system axis of rotation.

5. Pipe-end processing system as claimed in claim 1, characterized in that the spring is a helical spring and that it is configured to act radially relative to the system axis of rotation.

6. Pipe-end processing system as claimed in claim 5, characterized in that the helical spring is a compression spring.

7. Pipe-end processing system as claimed in claim 1, characterized in that the spring is integrated into the sub-assembly of body and implement holder and preferably is integrated into the body, preferably entirely, but at least along 90% of the spring's length.

8. Pipe-end processing system as claimed in claim 7, characterized in that the spring is configured in a recess of the body and that the implement holder is configured in radially displaceable manner next to the spring.

9. Pipe-end processing system as claimed in claim 1, characterized by comprising a rod configured radially to the system axis of rotation of the body and running through a feedthrough aperture in a wall of the body, being affixed at the radially inner side of the wall to the implement holder, running at the radially outer side of the wall of the body through the spring and comprising a terminal segment fitted with a head projecting from the spring, the spring being clamped directly or by means of a spacer between the wall of the body and the head.

10. Pipe-end processing system as claimed in claim 9, characterized in that the head is fitted with a threaded nut on a thread segment of the rod.

11. Pipe-end processing system as claimed in claim 1, characterized in that an implement support is used of which the center of rotation is situated in the system axis of rotation and in that the body is affixed, preferably detachably, in radially offset manner relative to the system axis of rotation to the implement support.

12. Pipe-end processing system as claimed in claim 1, characterized in that at least a portion of the body is constituted by an implement holder of which center of rotation contains the system axis of rotation.

13. Pipe-end processing system as claimed in claim 1, characterized by a chuck fitted with clamping jaws which can be clamped, symmetrically to the system axis of rotation inside a pipe to be processed, against the inside pipe peripheral surface in order to thereby affix the pipe-end processing system to the pipe.

14. Pipe-end processing tool characterized by a pipe-end processing system as claimed in claim 1 and by a support shaft bearing the pipe-end processing system and being rotatably supported in a housing axially to the system axis of rotation to be driven by a motor.

* * * * *